Jan. 1, 1963  J. STEINBICHLER  3,071,214
COMPOSITE TUBULAR SUPPORT, PARTICULARLY TUBULAR POLE
Filed Dec. 15, 1958  4 Sheets-Sheet 1
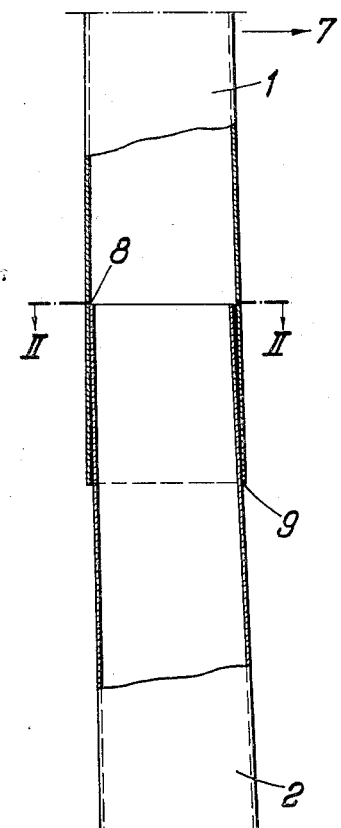
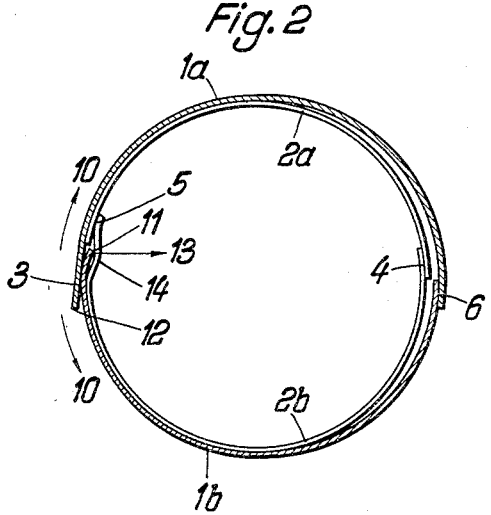
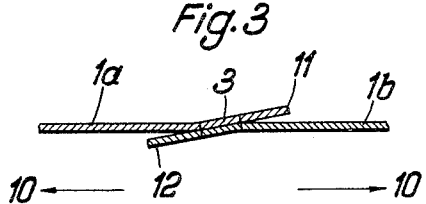
Inventor:

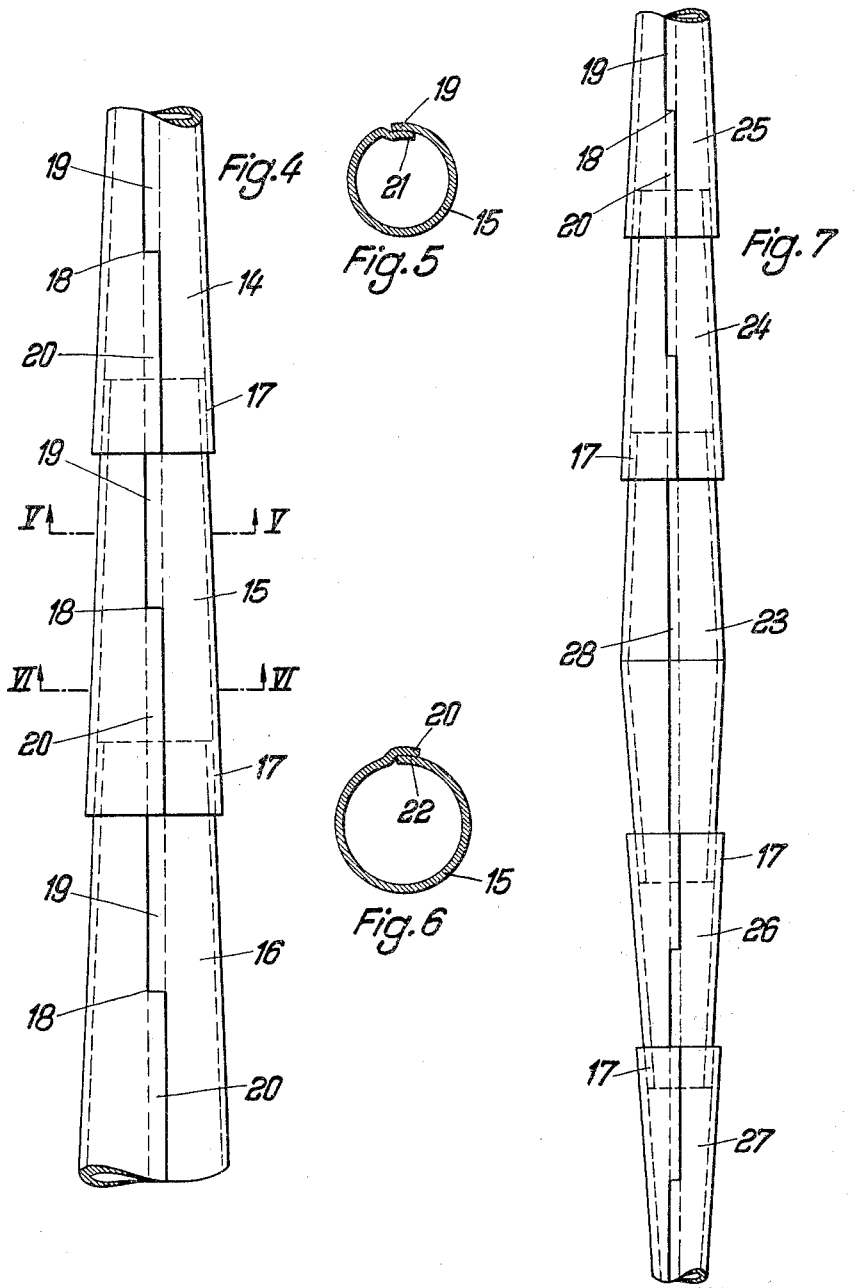

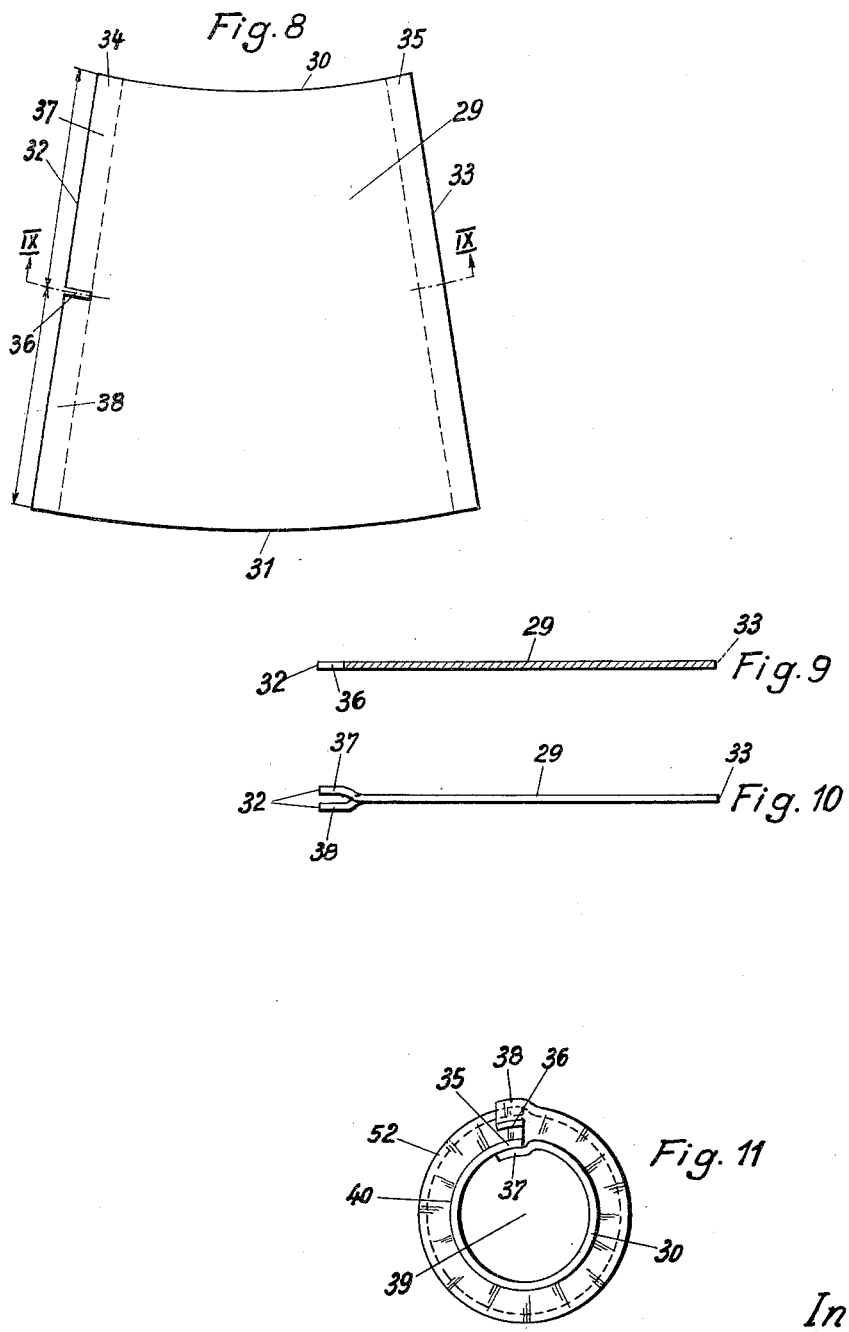

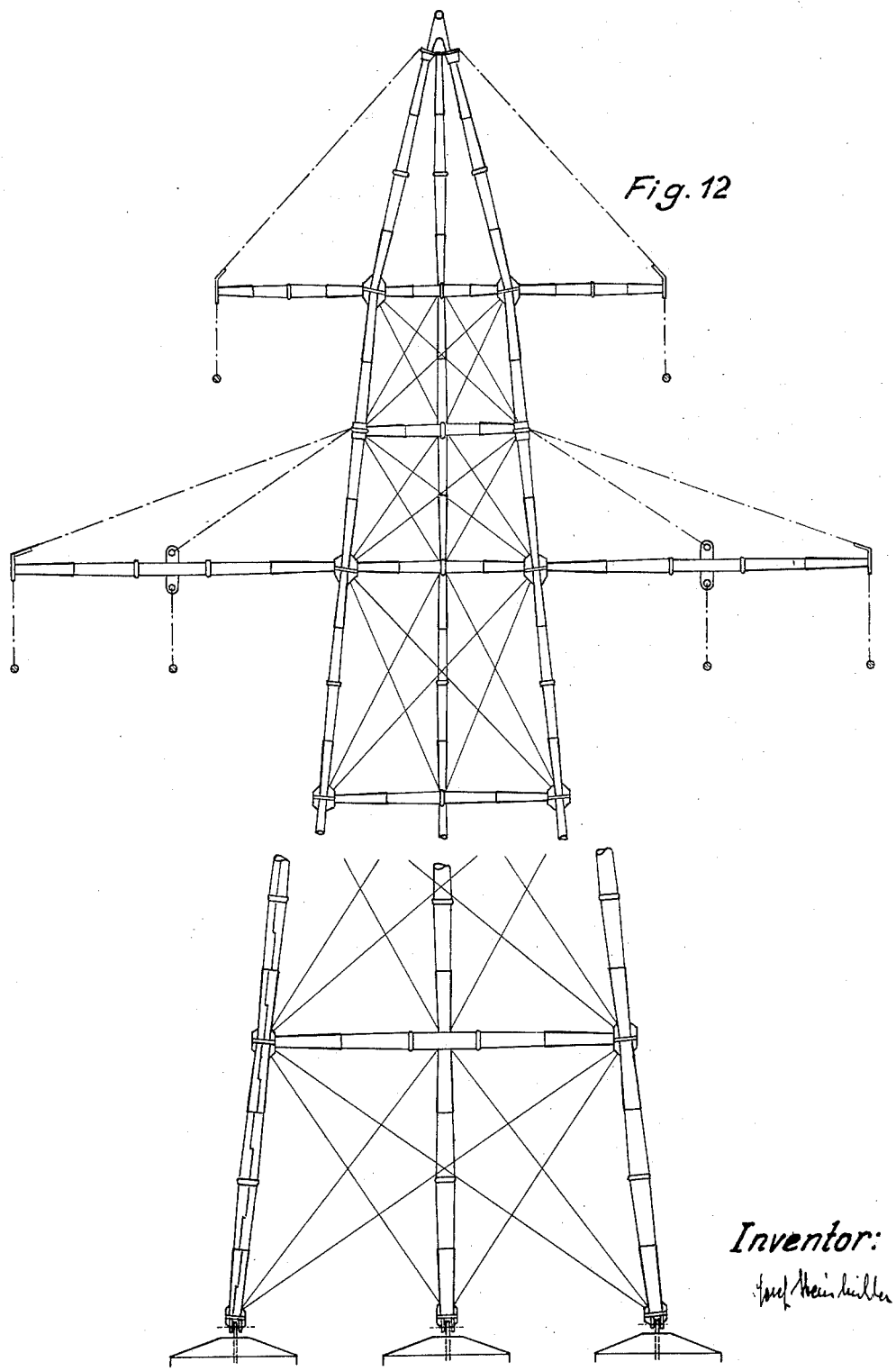

United States Patent Office 3,071,214
Patented Jan. 1, 1963

3,071,214
COMPOSITE TUBULAR SUPPORT, PARTICULARLY TUBULAR POLE
Josef Steinbichler, Rembrandtstrasse 8, Vienna II, Austria
Filed Dec. 15, 1958, Ser. No. 780,554
Claims priority, application Germany Dec. 19, 1957
3 Claims. (Cl. 189—26)

The present invention relates to a composite tubular support, particularly a tubular pole having tapered tubular sections fitted together with tapered joints.

Various tubular poles consisting of several tubular sections which can be fitted together have been disclosed, which consist of appropriately cut sheet metal members bent up to form a tube or of two half-shells joined to form a tubular section. The longitudinal edges of the sheet metal members or half-shells were formed to overlap or to abut each other and the overlapping or abutting edges were joined by welded seams. The seams which connect abutting or overlapping longitudinal edges involve a considerable reduction of the carrying capacity of the tubular pole compared to the load which can be safely carried by the raw material used because the permissible load on the seam zone is much less than the permissible load on the sheet metal used.

In order to increase the carrying capacity of the poles it has been disclosed to use non-weldable high-duty sheet metal and to punch the longitudinal margins of the sheet metal members to provide them with corresponding identical connecting tongues and slots so that the joining of the margins will enable an inter-engagement of the opposed to form locked seam tongues when the margins are laterally pushed one over the other. The firm connection of the two longitudinal margins thus joined by the tongues which form locking elements was effected by applying high pressure to the seam zone, i.e. the overlap zone, whereby the tongues were forced into the opposed slots and were deformed like rivet heads. Such locked seams enable the use of non-weldable sheet metal of relatively high tensile strength and the fabrication of tubular poles from sheet metal having a particularly high carbon content or from particularly hard, aged aluminium alloy. In order to ensure a large contact area between the tubes fitted one into the other in these tubular poles it has been proposed to provide the several elements consisting of two half-shells each with two overlapping longitudinal margins and to form them in such a manner that that shell of the inner tube which lies on the outside in the overlap zone engages the longitudinal margin of the inner shell of the outer tube. This ensures also that the several tubular sections are non-rotatably connected to each other. On the other hand, this construction has the disadvantage that two seams must be formed in each tubular section.

In spite of the connection of the longitudinal margins by means of the locked seam the carrying capacity of the tubular section is too low compared to the permissible load on the material used. Where locked seams are used the inner shells buckle inwardly in the fitting zone; this initiates the destruction of the tubular pole. This buckling will be explained more fully hereinafter with reference to FIGS. 1 to 3 of the accompanying drawings.

It is apparent from the above that independently of the seam structure the tubular poles of known type have the considerable disadvantage that their carrying capacity is too low compared to the permissible load on the material used. The endangered, low-strength zones of the pole, are the fitting zones, in which the several tubular elements engage each other.

It is an object of the present invention to avoid the disadvantages of the known composite tubular poles and to provide the tubular sections with seams constructed to afford a substantial increase of the permissible stress relative to the permissible stress of the material used.

To solve this problem, a composite tubular support, particularly a tubular pole, having tapered tubular sections fitted together with tapered joints, which sections consist of appropriately cut sheet metal members bent up to form a tubular section and welded at the overlapping longitudinal margins preferably throughout their length, is characterized according to the invention in that at least one part of the longitudinal edges is radially inwardly angled by one thickness of the sheet metal and at least one other part is radially outwardly angled, preferably in the same manner, and that only smooth surfaces of the tubular sections engage in a fitting zone.

Supports, particularly tubular poles, which are constructed according to the invention have large contact areas in the fitting zones. This contact is not disturbed by the welded seam because appropriate angled portions are provided in the lap zones. The longitudinal margins are suitably connected by resistance welding, which has the advantage over oxyacetylene welding or electric welding that the highest temperature is developed only directly at the contact surface of the two margins to be joined because in resistance welding the greatest resistance and highest temperature rise occurs at the points of contact. Experience has shown that in resistance welding the adjacent zones are not heated to practically the same temperature so that a reduction of strength adjacent to the lap zone is prevented. High-grade sheet steel, which is near the limit of weldability, is used to advantage in the several tubular sections. The longitudinal margins are suitably welded throughout the width of the lap zone because this will prevent the margins from bending up and the inner tubular parts from buckling inwardly in the fitting zones.

Because the tubular sections which can be fitted with tapered joints require smooth surfaces only in the fitting zones it is sufficient if the inner shell margin of the inner tube and the outer shell margin of the outer tube are angled only in the fitting zones to extend in the plane of the shell margin to be joined thereto. The angle portions may also extend throughout the length of the tubular sections.

To prevent the bending-up of one of the shell margins and the resulting inward buckling of a tubular section adjacent to the fitting zones when the support is under high load, due to a welded seam which is not effective as far as to the edge of the lap zone in the radial direction, the shell seams extend in fitting zones suitably in the same radial direction with respect to the center line of the support. If longitudinal margins of the tubular sections should bend up outside the welded zone, which is not to be expected, they would have to indent the lap zone of the inner tube, e.g., a zone of double sheet metal thickness, to cause the inner tube to buckle inwardly. This requires forces by which the highest permissible stress on the tubes outside the seam zones is exceeded.

Tubular sections constructed according to the invention are suitable for making single- and multiple-tube poles and for making spindle-type masts, which can take up only compressive forces and must be appropriately guyed. When constructed as a spindle-type mast, which forms a particularly lightweight construction where high mast such as transmitter masts or the like are required, it is suitable to provide a middle tubular section having smooth outside surfaces at both ends, over which additional tubular sections can be fitted. This construction of the spindle-type mast has the advantage that the middle section of the mast may have equal tubular sections fitted thereon and the tubular sections may be equal among themselves.

According to the invention the manufacture of tubular sections comprises cutting sheet metal panels in accordance with the angled portions of the tubular sections and providing the angled portions at the longitudinal margins before the cut parts are bent up to form tubular sections. This method of manufacture has the advantage that all necessary work can be performed on the flat sheet metal panels so that only simple tools are required for making the tubular sections.

The drawing illustrates in FIGS. 1 to 3 the relations which have led to the invention whereas FIGS. 4 to 7 show illustrative embodiments of supports constructed according to the invention.

More specifically,

FIG. 1 is an elevation, partly in section, showing the fitting zone of two tubes having a locked seam and fitted together.

FIG. 2 is a vertical sectional view taken along line II—II of FIG. 1.

FIG. 3 shows a portion of the lap zone of FIG. 2.

FIG. 4 is a fragmentary view of a single-pole mast constructed according to the invention.

FIG. 5 is a vertical sectional view taken along line V—V of FIG. 4.

FIG. 6 is a vertical sectional view taken on line VI—VI of FIG. 4.

FIG. 7 shows the construction of a spindle-type mast.

FIG. 8 shows a sheet metal panel which is required for making a tapered tubular section according to the invention after it has been angled after the formation of a slit in one longitudinal margin of said sheet metal member.

FIG. 9. is a cross-sectional view taken on line IX—IX of FIG. 8.

FIG. 10 is a top plan view of the top edge of a sheet metal panel according to FIG. 8 after the angled parts have been formed.

FIG. 11 is a top plan view of the top end face of a tapered tubular section obtained after the sheet metal panel according to FIG. 10 has been rolled up to form a tubular section and the longitudinal margins of this tubular section have been welded together.

FIG. 12 shows a three-pole spindle-type mast with cross-arms, which mast has been assembled from single spindle-type masts according to FIG. 7.

In FIGS. 1 to 3, 1 and 2 are the tubes of thin-walled sheet metal, which consist of the half-shells 1a, 1b and 2a, 2b and are fitted together. Associated half-shells are interconnected by locked seams at 3, 4, 5, and 6. It is assumed that a force acts on the tubular section 1 in the direction of the arrow 7 and sets up particular high stresses in the tubes 1 and 2 at 8 and 9. The force acting in the direction of the arrow 7 sets up tensile forces at 8 in the shells 1a, 1b, which tensile forces stress the seam 3 in the direction of the arrows 10. These tensile forces cause the margins of the shells 11 and 12 outside of the locked seam to bend up like horns, as is shown in FIG. 3. The bent-up sheet metal margin 11 causes a force acting in the direction of the axis of the tubular pole, indicated by the arrow 13, to buckle the half-shell 2b of the inner tube inwardly, as is shown at 14 in FIG. 2. This indentation in V-shape initiates the destruction of the mast because the compressive forces which are due to the compressive load on the tubular pole can no longer be taken up by the indented tubular portion. The V-shaped indentation expands throughout the fitting zone and increases the tendency of the pole to kink at this point. The V-shaped indentation of the inner tube parts in the fitting zones reduces the maximum permissible load of tubular poles to values which are much less than the values which can be achieved with a tube of the same material which is of uniform strength.

In FIGS. 4 to 7 and 12 are the tubular sections of linear taper which are fitted together. 17 is the fitting zones. The longitudinal margins adjacent to the overlap of the tubular sections 14 to 16 are cut at 18 so that two differently formed seam portions 19 and 20 can be provided. The construction of the lap zone adjacent to the smaller cross-section is apparent from FIG. 5 and adjacent to the larger cross-section of the several tubular sections from FIG. 6. FIG. 5 shows that the longitudinal margin 21 is angled so that the lap zone is formed in such a manner that the tubular sections have smooth outside surfaces adjacent to the smaller cross-section. On the other hand, FIG. 6 illustrates that the longitudinal margin 20 is angled relative to the longitudinal margin 22 so that the inside surface of the tubular section is smooth and has the shape of a circular ring. As a result, the smooth inside surfaces of the tubular sections in the portions largest in diameter engage in the fitting zones 17 the smooth outside surfaces of the inner tubular element throughout the length of the fitting zone. This is required to minimize the stress in the fitting zones when forces are transmitted from one tubular section to the other.

It is also apparent from FIG. 4 that the several tubular sections are so fitted together that the lap zones 19 and 20 have the same radial direction adjacent to the fitting zones so that the seams of the elements are in registry in the fitting zones.

FIG. 7 shows at 23 a double-tapered middle section of a spindle-type mast. Fitted thereon are at one end the tubular elements 24, 25 and at the other end the tubular elements 26, 27. The tubular elements are similar in construction to that shown in FIG. 4. They have lap zones 19 and 20 and adjacent to the longitudinal margins have a cut 18 each which extends at right angles so that different lap zones 19 and 20 can be formed, as is shown in FIGS. 5 and 6. The central element 23 is provided throughout its length with a lap zone 28 as is shown in FIG. 5 so that smooth outside surfaces of the central section 23 coact with smooth inside surfaces of the tubular elements 24 and 26 in the fitting zones 17 between the central section 23 and said tubular elements. The spindle-type mast shown in FIG. 7 represents a particularly lightweight construction for masts which are subjected only to compression in the direction of their longitudinal axis. It is known that tensile forces tending to act on such masts must be taken up by guys or the like. Spindle-type masts are particularly suitable for the construction of high masts, such as transmitter masts, which are not subjected to any substantial bending stress.

On principle, tubular poles as shown in FIG. 4 and spindle-type masts as shown in FIG. 7 may be combined to form multi-pole masts. The several masts may also be used as supports.

A sheet metal panel 29 for making a tubular section according to the invention is shown in FIG. 8 in a flat condition, before the panel is rolled up to form the tubular section. It is apparent that this sheet metal panel has arcuate edges 30 and 31 and longitudinal edges 32, 33. After the tubular section has been formed from this panel 29, longitudinal margins 34, 35 delimited by these longitudinal edges 32, 33 serve to maintain the shape of the tubular section at all times. To this end they are connected by resistance welding after the sheet metal panel has been rolled up to form a tubular section. The procedure according to the invention comprises cutting into the sheet metal panel 29 a slit 36, the length of which is equal to the width of the longitudinal margin 34. This means that the sheet metal panel 29 when seen in a cross-section taken on line X—X of FIG. 8 has the form shown in FIG. 9, in which the slit 36 is distinctly apparent. The longitudinal margin portions 37, 38 defined by the slit 36 are then angled in mutually opposite directions, as is shown in FIG. 10. After these preparations the sheet metal panel according to FIG. 10 may be rolled up to form the tapered tubular section shown in FIG. 11. During this operation the part 37 of the longitudinal margin engages the longitudinal margin 35 (see FIG. 8) radially inwardly in the direction toward the axis 39 of the tubular section in such a manner that in the resulting fitting zone, on which another tapered tubular section alined in the direction of the axis 39 is to be fitted, the outer boundary face 40 of the tubular section is exactly circular in cross section and belongs to the shell of a truncated cone as shown in FIGS. 5 and 11.

This is different in the lower part of the same tubular section adjacent to the part 38 of the longitudinal margin. When the tubular sections are assembled to form the support another fitting zone is formed here in conjunction with the next tubular section, which is slightly larger in diameter in this region than the tubular section under consideration and is formed like the tubular section shown in FIGS. 8, 9, 10 and 11 formed adjacent to the part 37 of the longitudinal margin. In accordance therewith the part 38 of the longitudinal margin engages the longitudinal margin 33 radially outwardly with respect to the longitudinal axis 39 of the tube so that the inner boundary face 52 of the tubular section shown in FIGS. 8, 9, 10 and 11 is exactly circular adjacent to the part 38 of the longitudinal margin and belongs again exactly to a shell of a truncated cone as shown in FIG. 6. These relations are shown in perspective in FIG. 11.

This enables the tubular section shown in FIGS. 8, 9, 10 and 11 to have fitted thereon adjacent to the part 37 of the longitudinal margin another tubular section, the inner boundary face belonging again to a hollow conical shell, a shell of a hollow cone so that there are no projecting parts which would prevent a snug engagement of the tubular sections in the range of 37, i.e. in the fitting zone. The same applies to the tubular section which has fitted thereon the tubular section shown in FIGS. 8, 9, 10 and 11. Because the inside periphery of the tubular section shown in FIGS. 8, 9, 10 and 11 is here defined by a shell of a cone, which is shown in cross-section at 15, 22, the tubular sections engage again on snug surfaces without projecting or recessed parts so that the fitting connection is of high strength.

After the tubular section shown in FIG. 11 has been formed the longitudinal margins 33, 37 and 38 are connected by resistance welding.

Within the fitting zones a connecting rivet or screw known per se, which is not shown, may transversely extend through the tubular sections fitted together so that the tubular sections are held against relative rotation not only by the frictional connection in the fitting zone but also by interlocking means.

FIG. 12 shows a three-pole spindle-type mast assembled from the spindle-type masts according to FIG. 7.

An essential advantage of supports constructed according to the invention resides in that contrary to the previously known tubular poles the seam can be arranged to extend in any desired direction with respect to the direction of force exerted on the mast, e.g., by a cross-arm in connection with electrical conductors whereas particularly in poles having locked seams the lap zone had to lie in the neutral zone owing to the relatively low strength.

Means for preventing a rotation of the several tubular elements relative to each other are not provided in the supports and poles according to the invention and in general such means are not required because the linear taper causes an engagement over relatively large areas in the fitting zones so that considerable forces are required for rotating the elements relative to each other. It is possible, of course, to provide explosion rivets and shear rivets, in known manner, which extend through the two elements arranged one over the other in the fitting zones. Such connecting elements will not be used in general. Where the poles are used as supports for electrical conductors a rotation of the tubular elements relative to each other when highly unequal tensile forces are applied to the cross-arms e.g., as a result of rope breakage, is even desirable. In this case it must only be ensured that the several elements will not be rotated by slightly different tensile forces. Such a rotation will not occur due to the appropriate design of the fitting zones.

I claim:

1. A composite tubular support adapted to resist buckling and compression forces comprising, in combination, at least two tubular sections each uniformly tapered between opposite ends thereof and each being in the form of a tapered tube of substantially circular cross section and having a small diameter end portion and a large diameter end portion and longitudinally extending margins welded together overlapping in peripheral direction, only one of said margins being formed between said small and said large diameter end with at least one peripherally extending slot, the outer boundary surface of the other of said longitudinal margins at said small diameter end portion being located in the outer truncated cone surface of said tapered tube and said one margin at said small diameter end portion being radially inwardly offset with respect to the margin portion welded thereto, the inner boundary surface of said other of said margins at said large diameter end portion being located in the inner truncated cone surface of said tapered tube and said one margin at said large end portion being radially outwardly offset with respect to the margin portion welded thereto, said uniformly tapered tubular sections being fitted together aligned in axial direction so as to form a fitting zone in which said tapered tubular sections overlap and snugly engage each other at all portions of truncated cone surfaces located in said fitting zone.

2. A composite tubular support as set forth in claim 1, sheet metal members forming said tubular sections, the extent to which said one margin of the tubular section smaller in diameter in the fitting zone is radially inwardly offset equalling to the thickness of the sheet metal forming said tubular section, and the extent to which said one margin of the tubular section larger in diameter in the fitting zone is radially outwardly offset equalling to the thickness of the sheet metal forming said tubular section.

3. A composite tubular support as set forth in claim 1, the longitudinally extending edges of said longitudinal margins in said fitted tube sections being respectively aligned in radial planes passing through the longitudinal axis of said support.

References Cited in the file of this patent

UNITED STATES PATENTS

| | | |
|---|---|---|
| 556,819 | Hartman | Mar. 24, 1896 |
| 1,034,483 | Mills | Aug. 6, 1912 |
| 2,285,209 | Katz | June 2, 1942 |
| 2,702,103 | Pfistershamer | Feb. 15, 1955 |
| 2,718,117 | Boyle et al. | Sept. 20, 1955 |
| 2,727,536 | Tennison | Dec. 20, 1955 |

FOREIGN PATENTS

| | | |
|---|---|---|
| 463,436 | Canada | Feb. 28, 1950 |